United States Patent [19]
Murray

[11] Patent Number: 5,467,362
[45] Date of Patent: Nov. 14, 1995

[54] PULSED GAS DISCHARGE XRAY LASER

[76] Inventor: Gordon A. Murray, 20306 Melville St., Orlando, Fla. 32833

[21] Appl. No.: 285,292
[22] Filed: Aug. 3, 1994
[51] Int. Cl.⁶ ................................................ H01S 3/30
[52] U.S. Cl. ................................... 372/5; 372/62; 372/65
[58] Field of Search .............................. 372/61, 62, 65, 372/5

[56] References Cited

U.S. PATENT DOCUMENTS

| | | | |
|---|---|---|---|
| 4,378,600 | 3/1983 | Hobart | 372/62 |
| 4,719,638 | 1/1988 | Carlson et al. | 372/61 |
| 4,734,915 | 3/1988 | Mefferd et al. | 372/62 |
| 4,736,379 | 4/1988 | Barker et al. | 372/34 |
| 5,319,662 | 6/1994 | Warner et al. | 372/62 |
| 5,341,392 | 8/1994 | Warner et al. | 372/62 |

Primary Examiner—Léon Scott, Jr.

[57] ABSTRACT

A high current, pulsed, high repetition rate, electric discharge, extreme ultraviolet and Xray laser. The low inductance discharge bore is constructed from a plurality of discs (18). The bore segments are separated from one another by spacers constructed from a refractory electrical insulator (20). The components in contact with the gas discharge are constructed from high temperature materials with low sputtering rates and low rates of ion burial. Gas return holes (74) are provided in the bore segments discs. Xray reflecting mirrors form an optical cavity.

21 Claims, 5 Drawing Sheets

PULSED GAS DISCHARGE XRAY LASER

BACKGROUND

1. Field of Invention

This invention relates to short wavelength gas discharge lasers. In particular to pulsed extreme ultraviolet and Xray lasers.

2. Description of Prior Art

Pulsed Xray and extreme ultraviolet lasers operate on transitions between highly ionized atomic states. For example in Argon the fourth to fifteenth ionized states of the atom produces excited states that generate transitions in the soft Xray and extreme ultraviolet region of the electromagnetic spectrum. Many extreme ultraviolet lines with wavelengths below 200 nm have been observed, several have produced pulsed laser output. The conditions to produce Xray and extreme ultraviolet laser output are created during a pulsed gas discharge or in it's afterglow. Pulses with peak current densities of thousands of amps per square centimeter are required to generate large numbers of such highly excited states. To produce high peak currents a very low inductance electrical pulser configuration is required. Additionally the discharge is confined to narrow diameter cylindrical region by the laser geometry. The narrow bore produces a high current density. High peak current discharges are generated by the rapid switching of a capacitor. The capacitor is charged to a high voltage, typically 10–30 kilovolts. The energy stored in the capacitor is switched into the discharge by a fast high voltage switch such as a thyratron.

Heretofore described pulsed discharge Xray and extreme ultraviolet lasers have used continuous bore tubes. In these lasers a gas discharge is produced in a narrow bore tube. The tube may be filled with a low pressure gas. In some cases the inner wall material of the tube is evaporated during the electrical pulse to produce the active plasma of the discharge. A major disadvantage of this method is that the tube material is rapidly consumed by the discharge due to sputtering and evaporation even when the tube is filled with low pressure gas. Xray lasers have used narrow diameter continuous bores described as capillaries. The discharge is known as a capillary discharge. Similarly gas discharge extreme ultraviolet lasers have used larger diameter continuous bores constructed from fused silica.

The production of Xray laser output from a pulsed discharge requires high peak current densities in excess of 5000 amps per square cm. High current gas discharges like this are known to cause ion and electron sputtering and ion burial at surfaces near the gas discharge. Sputtering and ion burial results in gas loss from the laser system. The magnitude of the gas loss depends upon the discharge bore geometry, the discharge current and the construction material of the internal laser components. Fused silica has a relatively high sputtering and ion burial rate. Gas is lost rapidly in lasers constructed with fused silica bores and material from the bore contaminates the active laser gas. The contamination may absorb at the laser wavelength and reduce or extinguish laser output.

Additionally in these devices the pulsed electrical discharge produces a gas pumping effect in which the gas is pumped from one end of the tube to the other. The magnitude and direction of this pumping are dependent upon the discharge current and the pulse repetition rate and other factors. The gas pumping effect results in a reduction of laser output energy in sealed off systems. Often gas return lines are added to the laser to allow for pressure equalization. Also the laser may be operated non sealed off with a flowing gas source. A further problem caused by gas pumping is the differential pumping rates of different gases, this leads to gas separation in discharges consisting of binary or ternary gas mixtures.

The pulse repetition rate in continuous bore lasers is limited due to bore heating. The pulsed gas discharge causes heating which can melt or soften the bore at high repetition rates. This has limited the repetition rate of continuous bore lasers.

There is no sealed off long life laser source of extreme ultraviolet or Xrays.

SUMMARY OF INVENTION

An object of the present invention is to provide a long life source of high average power, high peak power, Xray and extreme ultraviolet laser output below 200 nanometers. The laser might be used to expose photoresists to produce integrated circuits. A further object is to provide a laser that can operate at high repetition rate and is capable of operating at the high temperatures produced by the high power loading caused by high repetition rate operation.

A further advantage is that the new laser can produce greater Xray and extreme ultraviolet laser output than continuous bore laser. The high current densities that are required to generate Xray lasing are produced by creating a high current density gas discharge in a small diameter segmented bore laser. Myers U.S Pat. No. 3,501,714 has described a segmented bore laser for low D.C. currents. Improvements on this design, Hobart U.S. Pat. No. 4,378,600, have increased heat conduction to the cooled ceramic wall and improved gas return, Carlson U.S. Pat. No. 4,719,638.

The pulsed high current discharge causes high sputtering and subsequent bore damage. A segmented bore discharge tube can withstand much larger current densities than a continuous capillary discharge bore, because it is constructed from materials with lower sputtering rates. The Xray and extreme ultraviolet laser output increase non linearly with the increase in current. Above the laser threshold the laser output increases much more rapidly than linearly with current increase. A segmented bore Xray laser can produce much higher Xray output because higher current densities can be produced before bore damage occurs.

Additionally the refractory metal discs that constitute the in bore segments enable the laser to withstand the high temperatures produced by high power dissipation. The high power dissipation is a consequence of operating the laser at high repetition rate. The high repetition rate is required to maximize the average power output of the laser. The average power is the product of single pulse energy and repetition rate. Heretofore pulsed discharge Xray lasers with continuous bores were limited to repetition rates of a few pulses per second. This is due to the lower melting points and the higher sputtering and ion burial rates of the continuous bore materials. A segmented refractory metal bore can operate to higher repetition rates.

The bore is segmented because the discs are made from a refractory metal that is electrically conducting. The bore segments are separated by spacers fabricated from an electrical insulator such as fused silica or ceramic. The segment spacers are located at the edges of the discs and are not in contact with the gas discharge. Therefore the spacers do not reach the high temperatures generated on the discharge axis.

Also the spacers are not exposed to significant sputtering or ion burial. The refractory metal bore segments are very resistant to sputtering and ion burial. These processes remove gas from the discharge and damage the bore. For example Tungsten has a sputtering rate approximately a factor of 100 lower than fused silica. This is especially important at the high peak current densities used to generate Xray laser output.

A further advantage of the laser is the vaporized and ionized bore materials do not absorb at the laser wavelengths. In high peak current pulse discharges some of the bore and electrode materials are vaporized and ionized. The materials forms an ionized metal vapor plasma. This plasma can absorb strongly at the laser wavelength particularly in the Xray region. Refractory metals have a high atomic number which do not absorb significantly in the Xray spectral region in which the laser operates. Also refractory metals have higher melting points and produce lower density metal vapor plasmas than lower melting point metals such as Aluminum. This results in less plasma contamination from metal vapor. Contamination can cool the plasma and reduce the degree of ionization in the plasma. Cooling here refers to reducing the average electron energy in the plasma. A high average electron energy is advantageous. Plasma cooling occurs in capillary discharges near the capillary wall. Since the invention does not have a continuous wall surrounding the gas discharge there is less plasma cooling. This is an advantage of the laser geometry.

A further advantage of the laser is that it is constructed entirely from materials and seals capable of withstanding a high temperature bakeout. A high temperature bakeout is typically required to obtain a long sealed off operating fife. Sealed off operation eliminates the need for support equipment such as a vacuum pump and a source of active laser gas. The equipment required to control gas flow and pressure adds significantly to the bulk and weight of the laser system. The high temperature materials are also essential for high repetition rate operation. The high repetition rate may dissipate kilowatts of heat. This can result in the temperature on the laser bore reaching up to 2500 centigrade. Previous lasers, Marling and Massey et at, Steden have been constructed from materials that could not withstand operating temperatures above approximately one hundred and fifty centigrade. Additionally previous lasers could not be baked out above approximately one hundred and fifty degrees centigrade.

Sealed off operation eliminates the need for support equipment such as a vacuum pump and a source of active laser gas. The equipment required to control gas flow and pressure adds significantly to the bulk and weight of the laser system.

An object of the electrical pulsing system is to produce a fast pulse. The fast pulse lead to high peak currents that are required to produce the highly ionized states that generate the deep ultraviolet lasing. The generation of a fast pulse requires that stored electrical energy be rapidly transferred to the gas discharge. An object of the laser tube design is to minimize the electrical inductance of the tube.

A gas refill system may be attached to the laser to compensate for any gas consumption caused by discharge processes.

Further objects and advantages of my invention will become apparent from a consideration of the drawings and ensuing description of it.

DESCRIPTION OF FIGURES

In the drawings, like or corresponding parts are designated with the same reference numerals.

DESCRIPTION OF INVENTION

Figure 1:
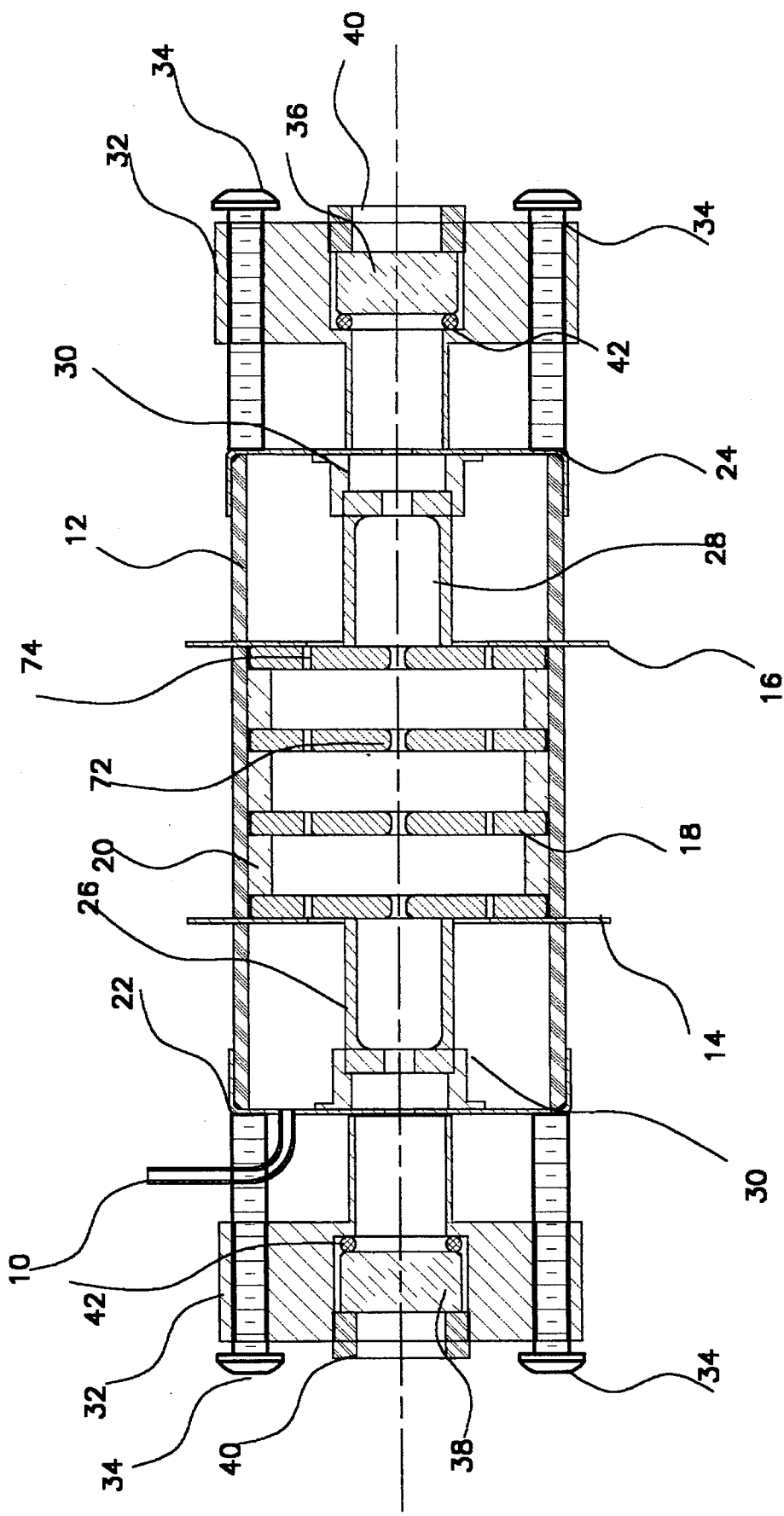
FIG. 1 shows a sectional view of the segmented bore pulsed Xray laser discharge tube, with a front and rear mirror.
Figure 3:
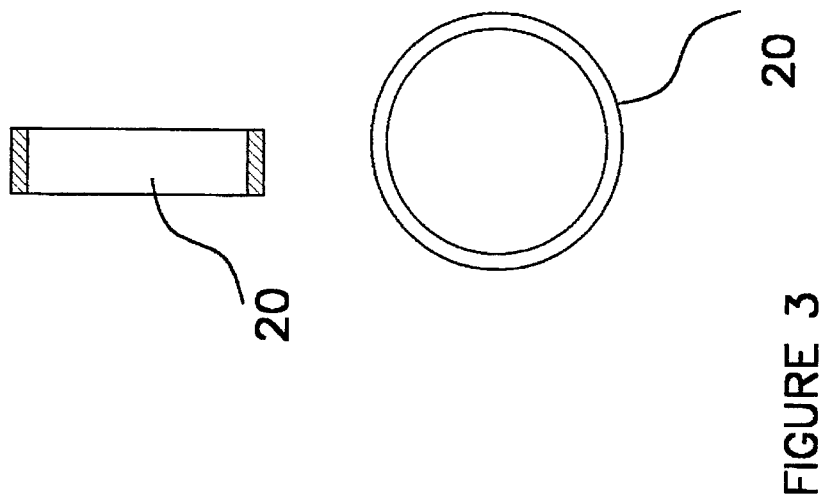
FIG. 3 shows a bore segment spacer.
Figure 2:
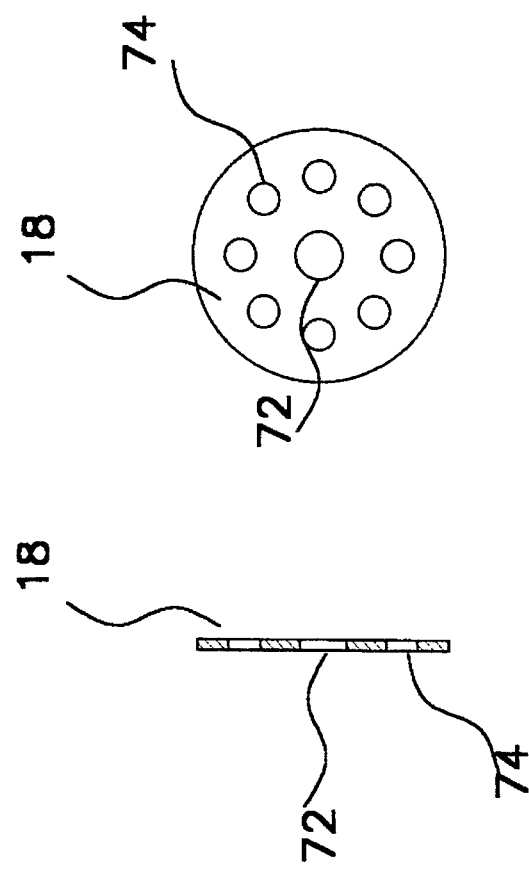
FIG. 2 shows a bore segment.

FIG. 1 shows the segmented bore pulsed Xray laser in a sectional view. The tube 12 made be fabricated a ceramic or fused silica. Fused silica TRUE BORE may be used or alumina ceramic with internal diameter tolerances of +/−0.25 mm or better are available from WESGO DURAMIC. If a tighter tolerance is required the internal surface of the ceramic may be machined. The tube has a wall thickness of 2 to 4 mm. The bore segments 18 are discs typically constructed from Tungsten or other refractory metal. FIG. 2 shows a bore segment. The Tungsten discs are typically 10 millimeters to 50 millimeters in diameter but may be smaller or larger and typically a millimeter to a few millimeters thick. The entire disc may be machined or punched from a sheet of refractory metal such as Tungsten or Molybdenum, but other materials may be used. Tungsten and Molybdenum sheet may be obtained from TELEDYNE ADVANCED MATERIALS. As can be seen in FIG. 2 the disc has a central aperture 72. This is the discharge aperture. This aperture is typically 0.25 millimeters to 2 millimeters diameter. The apertures situated off the central axis 74 are gas return holes. The gas return apertures each have a diameter less than that of the central discharge aperture. The bore segment spacer 20 shown in FIG. 3 is slightly smaller diameter than the internal diameter of the tubular vacuum vessel 12. As shown in FIG. 1 a bore segment spacer is located between adjacent disc bore segments. The spacers separate the discs by approximately 2 mm, but this distance may be larger or smaller. FIG. 1 shows a laser consisting of four bore segments and four spacers however lasers may consist of more or less bore segments and spacers. Typically an extreme ultraviolet laser with longer wavelength would use more discs and spacers than a short wavelength Xray laser. An extreme ultraviolet laser might use tens of discs. FIG. 1 shows the anode and cathode electrical connections adjacent to the first and last bore segments. The anode and cathode connections 14, 16 penetrate the body of the tubular vacuum vessel 12. The purpose of these connections is to minimize the electrical inductance of the discharge tube. A low inductance results in a more rapid current pulse and hence higher peak currents. A hollow cathode 26 is located at one end of the discharge tube, a hollow anode 28 at the other end. 26 and 28 are made from a refractory metal such as Molybdenum or Tungsten. These materials are available from TELEDYNE ADVANCED MATERIALS. 26 and 28 are attached to 22 and 24 respectively by mounting components 30. The entire assembly is contained within a tubular vacuum vessel 12. At each end of the laser tube an adjustable mirror mount 32 is welded to the end caps 22 and 24. The mirror mounts may be adjusted by the adjustment screws 34. Appropriately coated optical components to produce laser action are located coaxial with the discharge bore in each mirror mount 36 and 38. The rear mirror 36 is typically coated to maximize the reflectivity at the lasing wavelength. The front mirror 38 is coated with a reflective coating to maximize the laser output power. The substrate of the front mirror 38 also transmits at the laser wavelength. The minors are sealed to the laser body by sealing rings 42. Pressure to cause compression and sealing of the sealing rings is applied by the compression rings 40.

Figure 4:
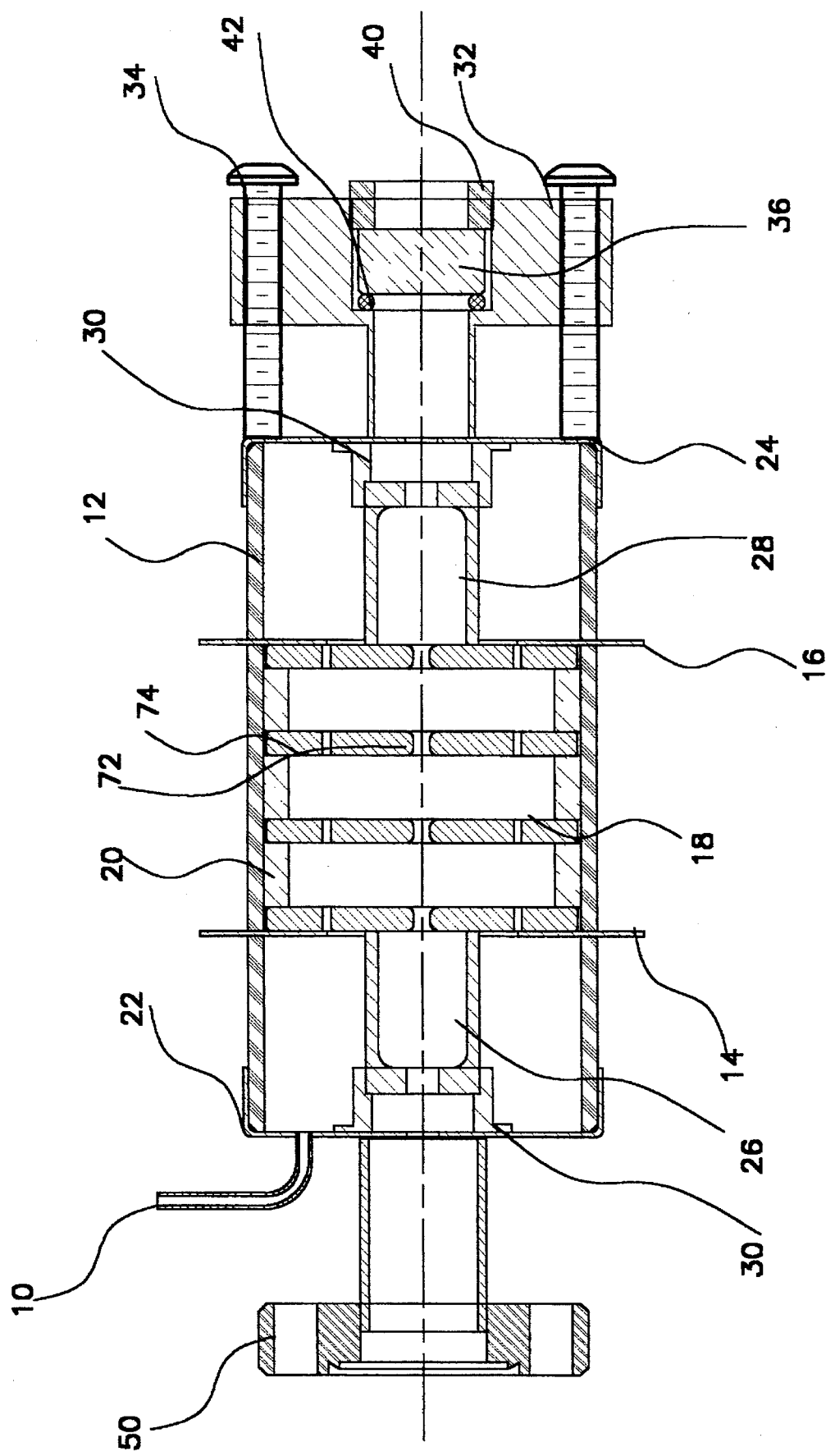
FIG. 4 shows a sectional view of the segmented bore pulsed Xray laser discharge tube, with a rear mirror only, the output end couples directly into vacuum by way of a vacuum flange.

FIG. 4 show a laser tube with a vacuum flange 50, attached to one end of the laser. The flange is in place of an output mirror. The laser gain is high enough to allow lasing with one mirror or without mirrors.

Figure 5:
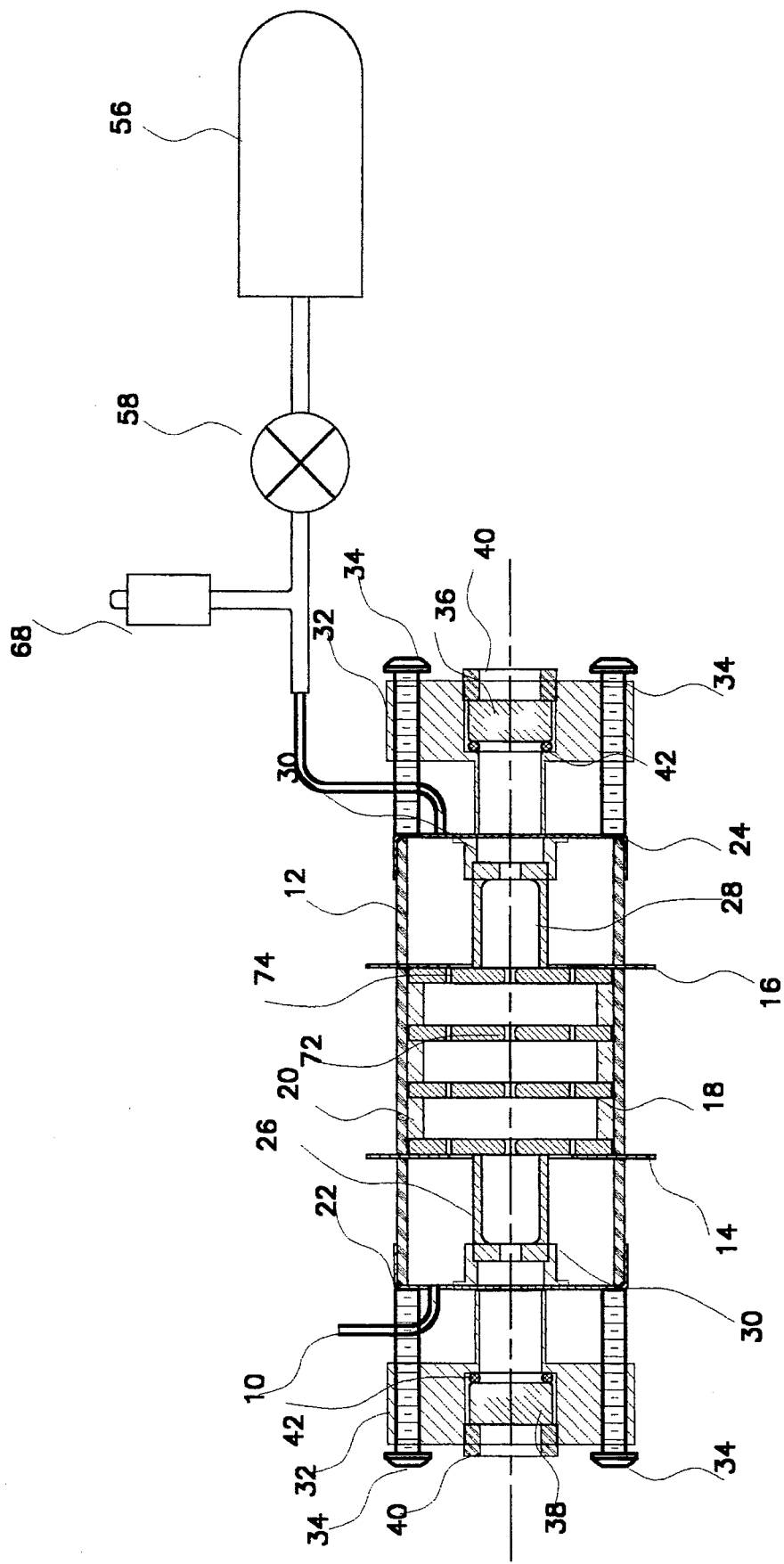
FIG. 5 shows a pulsed laser system including the pulse a gas pressure control system for long term sealed off operation.

FIG. 5 shows the laser system with a gas reservoir and valve. 56 is a gas reservoir, 58 is a valve separating the reservoir and the laser tube. A pressure sensor 68 is attached to the laser tube.

Figure 6:
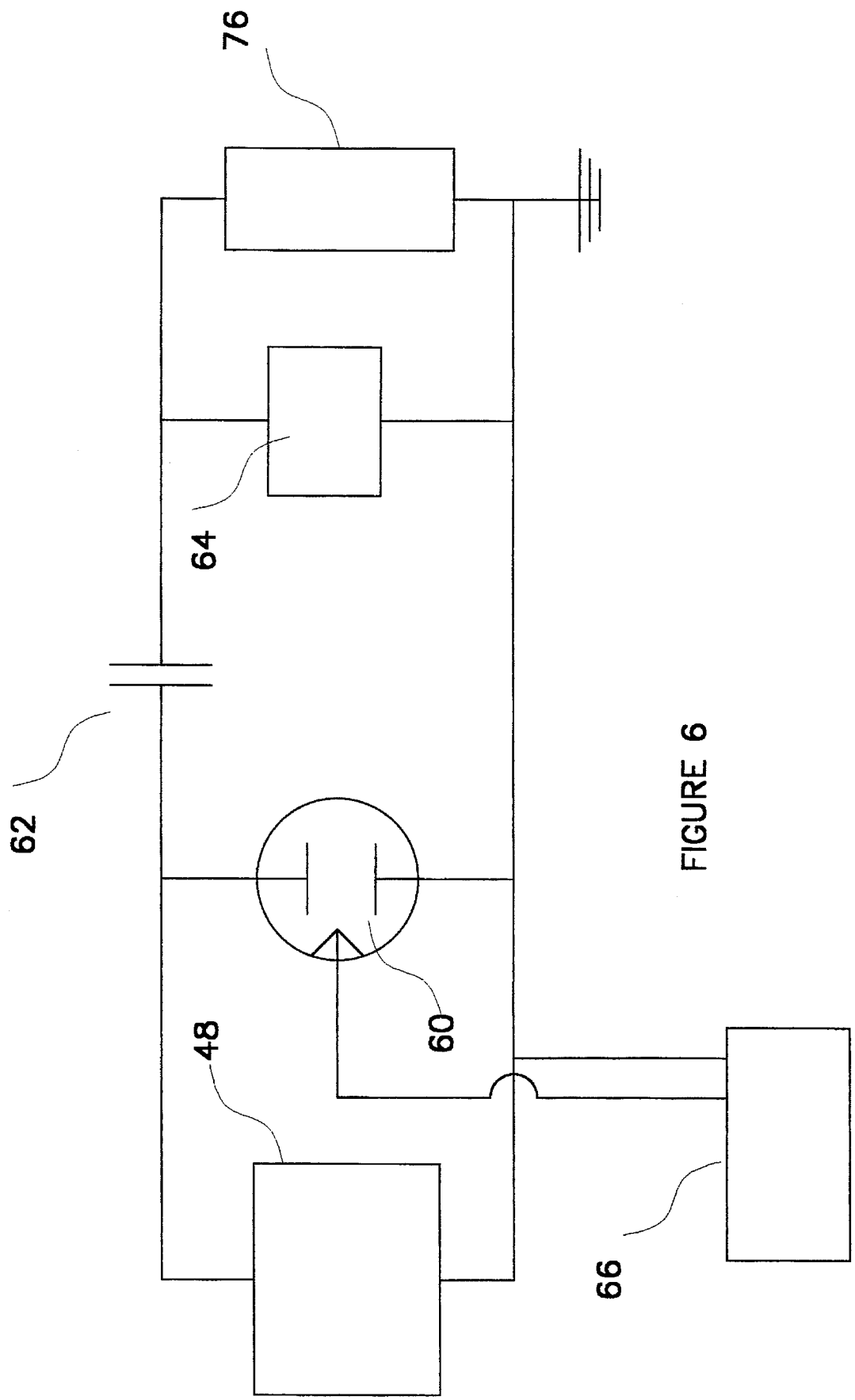
FIG. 6 shows the electrical circuit to produce high peak current pulses in the laser.

FIG. 6 shows a diagram of an electrical pulser used to electrically excite the laser. The pulse power system comprises a high voltage power supply 48, a capacitor 62, a pulse forming network 64, a high voltage switch 60 and a trigger mechanism 66 for the high voltage switch, 76 is an electrical symbol for the laser.

DESCRIPTION OF PREFERRED EMBODIMENT

The preferred embodiment shown in FIG. 1 exhibits general cylindrical symmetry. The preferred embodiment is optimized for Xray laser output, an extreme ultraviolet version of the laser would be longer. The segmented Tungsten disc bore is contained within a tubular vacuum vessel 12. The Tungsten discs are separated by insulating spacers made from fused silica. The fused silica spacers and the discs have outer diameters somewhat smaller than the internal diameter of the tube. The spacers are approximately 2 mm thick in the radial dimension. The discs are spaced from one another by approximately 2 mm and are approximately 12 mm diameter. The tube is typically fabricated from a ceramic material such as Alumina. The anode and cathode electrode connections 14, 16 are joined to the tube and penetrate the outer wall of the tube for the purpose of connecting electrically to the electrical pulser. The distance between the anode and cathode connections is approximately 20 mm The tube extends beyond the electrode penetrations and terminates in end caps 22, 24 at each end which are joined to the tube. The internal tube section between the electrode penetrations and the end caps is made up of cylindrical electrode sections 26, 28 of external diameter approximately half that of the ceramic tube. The internal diameter is greater than the bore diameter. These regions function as a hollow cathode and hollow anode electrode. 26 and 28 slip fit into mounting components 30. These components allow for axial expansion and contraction of the laser bore and electrode assembly due to temperature changes. The components 30 are joined to the end caps 22 and 24. The end caps are joined to mirror mounts at each end. The mirror mounts hold mirrors 36 and 38 which provide appropriate reflectivity at the lasing wavelength. The mirrors may be multilayer metal coated to give high reflectivity in the soft Xray region. The mirrors are be sealed to the mirror mounts by a compression seal 42. The mirrors are pressed against the seal by a compression ring 40. The overall length of the laser is approximately 120 mm. The entire assembly is filled with low pressure gas and is gas tight. A gas fill port 10 permits the laser to be evacuated and filled with low pressure active gas. The laser may be sealed off by pinching off or valving off the gas port.

In FIG. 6, the main storage capacitor 62 is charged to a voltage produced by the high voltage power supply 48. This voltage is typically between 10,000 volts and 40,000 volts although it may be higher or lower. A gas electric switch 60 such as a thyratron or spark gap is used to rapidly switch energy stored in the capacitor into the gas. The thyratron switch 60 is triggered into conduction by the trigger unit 66. This action produces a high voltage pulse at the cathode connection 14 in FIG. 1. A high potential difference is produced between the cathode and the anode. This causes gas breakdown and the formation of a gas discharge between the cathode and the anode through the central apertures. The discharge persists for the time of the applied current pulse. The discharge circuit and the laser tube are constructed to give a low electrical inductance. The low electrical inductance produces a rapid current pulse. The discharge is constrained to the central aperture in the Tungsten discs 72 since this aperture has the largest cross sectional area. A high current density gas discharge is created. The high current density produces a highly ionized plasma with low contamination levels. This type of plasma generates large numbers of highly ionized atoms. Population inversions are created between the highly ionized levels either in the gas discharge or by recombination in the afterglow. The afterglow occurs mainly after the current pulse has ceased and the plasma is cooling. Laser action in the extreme ultraviolet and Xray region results from stimulated emission from the population inversions generated by the discharge.

The high current gas discharge produces a population inversion between excited ionized states. Radiative transitions between these states produce extreme ultraviolet and Xray radiation. Examples are the 17.2 nanometer line of the Krypton spectrum or the 46.9 nanometer Argon line. Very high optical gain is produced by the population inversion. This results is laser output being produced. The laser output can be super fluorescent in which case no mirrors are required. Alternatively laser mirrors aligned with the discharge axis can form a laser resonator to extract the laser output. Appropriately coated laser mirrors are placed coaxial at the ends of the laser tube 36 and 38. The mirrors terminate the gas confining vessel and are in direct contact with the gas fill. Xray laser output is produced at the output laser mirror. Alternatively ultraviolet transmitting windows mounted at may be used to terminate the gas confining vessel. The current pulsing is repeated at regular intervals. Rapid repetition of the pulsing up to 5000 times per second results in considerable heating of the bore segments. In which case the tube 12 may be liquid cooled. The bore temperature may rise to approximately 2500 centigrade. Materials with low melting points are unsuitable for the construction of the bore.

During the high current discharge pulse a pumping action is produced which pushes the active gas is from one end of the tube to another. The effect is known in the art as gas pumping. The direction depends upon a number of factors including bore diameter and discharge current. The gas pumping results in a pressure differential along the tube. The gas flows back to equalize the pressure through the gas return apertures 74 in the Tungsten bore segments 18.

An alternative configuration is shown in FIG. 4. One end of the laser is terminated by a laser mirror. The other end is terminated with a vacuum flange 50. The laser is not sealed off and may be connected to a vacuum system. A source of low pressure gas is used to maintain the correct gas pressure in the laser discharge region. Typically the laser output does not transmit well through air. This arrangement allows the laser radiation to directly couple into a vacuum chamber where the beam propagates without significant attenuation. The flange may also couple the laser into a low pressure gas chamber that is filled with low pressure gas. The low pressure gas is chosen such that it is transmitting at the wavelength of the laser radiation. Other similar arrangements in which the laser uses two mirrors or one mirror and a window or no mirrors are possible. In these cases the vacuum flange is attached to the vicinity of the output mirror or output window.

FIG. 5 shows a laser system including a gas reservoir to compensate for consumption of the active gas by plasma processes. The gas reservoir 58 contains the active gas or active gas mixture at a pressure greater than the laser tube pressure. The reservoir is connected to the laser tube through a valve 56. A measured volume of gas may be added to the laser tube by opening and closing the valve. Other arrangements with more than one valve are possible. Gas pressure in the laser tube may be reduced by consumption of the active gas by sputtering or ion burial. The gas reservoir is used to maintain the pressure of the active gas in the laser at close to the optimum pressure for lasing. A pressure sensor 68 may be added to the laser tube. An electronic feedback controller or a microprocessor system, not shown, may be used to control a solenoid valve to automatically maintain the gas pressure near the optimum for lasing.

The discharge apertures in the bore segments at the anode and cathode end may be modified. The diameter of the discharge apertures are increased as the bore segments near the anode or cathode. Typically the first few segments at each end would be modified. The first segment at each end would be approximately 3 times the main bore diameter. The aperture diameter in subsequent segments would decrease in diameter until the diameter of the bore was reached.

The laser may produce single tranverse mode, TEM00 output or multimode output. The laser mode depends upon the diameter of the central axial bore apertures, the mirror separation and the radii of curvatures of the mirrors. Typically the mode can be best controlled by the bore diameter.

The tube may be placed within a solenoid magnetic field. The magnetic field can increase the ionization density in the discharge plasma.

The laser tube may be surrounded by a liquid cooling jacket to remove excess heat. The cooling jacket is situated on the outside diameter of the laser tube.

An alterative optical arrangement in which the laser tube is terminated with ultraviolet transmitting windows is also possible. An example of suitable materials for extreme ultraviolet widows would be Magnesium Fluoride or Lithium Fluoride.

Only the section of the bore segment in contact with the gas discharge need be fabricated from a low sputtering and low ion burial rate material. The outer region of a bore segment may be fabricated from many materials and joined to the refractory material.

Conclusions, Ramifications and Scope of Invention

The invention provides a much improved pulsed extreme ultraviolet and Xray laser. The laser can operate at high repetition rate and sealed off. The laser can be used a source of intense electromagnetic radiation in the wavelength range of 1–200 nanometers. It is intended that the scope of the invention be defined by the claims.

I claim;

1. A gas filled, electric pulse excited, longitudinal gas discharge, laser tube comprising;

a gas tight elongated cylindrical electrically insulating vessel having an inner wall and an axis, said vessel containing a metal cathode electrode and metal anode electrode disposed within, said cathode electrode is disposed at one end of the vessel said anode electrode is disposed at the other end of the elongated electrically insulating vessel, said electrodes are joined to the said elongated electrically insulated vessel;

a plurality of electrically conducting discs disposed generally perpendicular to the axis, said discs are disposed between said anode and cathode electrodes and are surrounded by said elongated electrically insulating vessel, said discs each having an aperture co-axially aligned with said tube axis, said discs are separated from one another by spacers constructed from a refractory electrical insulator, said spacers having an internal dimension greater than said axial aperture dimension and an external dimension less than an internal dimension of the insulating vessel, means for exciting the gas in said laser tube with a fast high peak current electrical pulse having a peak current density greater than 50,000 amperes per square centimeter and sufficient to produce an optical output below 200 nanometers.

2. Apparatus according to claim 1 wherein said discs are constructed from a refractory metal such as Molybdenum or Tungsten.

3. Apparatus according to claim 1 wherein said discs have additional apertures; said additional apertures being individually of smaller cross sectional area than said axial aperture, said additional apertures are separate from said axial aperture and are disposed between the axial aperture and the distal edge of the disc, whereby said additional apertures permit equalization of pressure differences caused by gas pumping.

4. Apparatus according to claim 1 wherein said means for extracting a laser beam comprises laser mirrors in direct contact with the laser gas, said mirrors are disposed about axis of the tube.

5. Apparatus according to claim 1 wherein said apertures are circular and the laser output beam is radially symmetric; said radial symmetry is in the laser beam intensity distribution and in the laser beam divergence.

6. Apparatus according to claim 1 wherein the laser output wavelength is below 30 nanometers in the soft Xray region of the electromagnetic spectrum.

7. Apparatus according to claim 1 wherein the construction materials of the entire discharge tube and the material used to join parts is heated to a temperature of 350 centigrade while maintaining vacuum integrity.

8. Apparatus according to claim 1 wherein said discs and said cathode and anode electrodes are constructed from refractory metals.

9. Apparatus according to claim 1 wherein the gas fill contains at least one gas species;

said gas species producing laser output during one discharge cycle and it's afterglow;

said gas species producing laser output at different wavelengths.

10. Apparatus according to claim 1 wherein a second gas is added to the active lasing gas to increase the magnitude of the laser power output due to the active lasing gas.

11. Apparatus according to claim 1 further including a source of at least one active laser gas at a pressure in excess of the operating pressure of the laser discharge tube;

said source of gas connected to but separated from the main laser volume by a valve;

whereby said source of gas is used to replenish the gas in the main laser vessel and maintain the optimum pressure for maximum laser output should the gas in the main laser vessel become reduced in pressure.

12. Apparatus according to claim 11 further including a gas pressure sensor connected to the main laser volume;

whereby said pressure sensor is used to determine whenever the gas pressure in the main laser volume decreases below the optimum for maximum laser output.

13. Apparatus according to claim 12 further including a feed back control or microprocessor system to automatically maintain the gas pressure in the main laser volume at the optimum for maximum laser output;

said feedback controller can determine the gas pressure through said gas pressure sensor, said feedback controller capable of opening and closing said valve to add a controlled amount of gas to the main laser volume.

14. Apparatus according to claim 1 wherein said laser discharge tube is terminated on the optical axis with windows that are transparent at the laser wavelength.

15. Apparatus according to claim 1 wherein said discs are constructed from a plurality of materials, the material comprising the axial section of the disc in contact with the gas discharge being a refractory metal.

16. Apparatus according to claim 1 wherein said discs disposed adjacent to the said electrodes have axial bore aperture of larger diameter than the apertures in the discs disposed furthest from the anode and cathode electrodes, whereby said increased diameter apertures result in a discharge bore tapered at each end.

17. Apparatus according to claim 1 further including a volume of at least one active laser gas at the operating pressure of said laser discharge tube;

said source of gas connected to the main laser volume.

18. Apparatus according to claim 1 wherein one end of said laser discharge tube is terminated by a laser mirror and the other end is terminated by a vacuum flange, whereby said vacuum flange may couple the laser to a vacuum system or a chamber containing a gas which is transmitting to the laser output.

19. Apparatus according to claim 1 wherein the means for extracting pulsed laser output comprises both ends of the laser tube being open.

20. Apparatus according to claim 1 further including a liquid cooling jacket disposed about the outer diameter of said elongated electrically insulated tube.

21. A gas filled pulse excited longitudinal electric discharge laser vessel comprising;

a gas tight elongated electrically insulating vessel having an inner wall and an axis, said vessel containing a metal cathode electrode and metal anode electrode disposed within said gas tight elongated insulating vessel, said cathode electrode is disposed at one end of the vessel said anode electrode is disposed at the other end of the elongated electrically insulating vessel, said electrodes are joined to the said elongated electrically insulated vessel;

a plurality of electrically conducting thin plates disposed generally perpendicular to the axis said thin plates are disposed between the said anode and cathode electrodes and are surrounded by the said elongated electrically insulating vessel, said thin plates have a dimension in the direction perpendicular to the tube axis somewhat less than an inner dimension of the elongated insulating vessel, said thin plates each having an aperture co-axially aligned with the vessel axis, said thin plates are separated from one another by spacers constructed from a refractory electrical insulator, said spacers having an internal dimension greater than a aperture dimension and an external dimension less than an internal dimension of the insulating vessel, said thin plates and spacers are disposed between the anode and cathode electrodes;

means for electrically pulse exciting said tube with a high peak current pulse having a peak current density greater than 50,000 amperes per square centimeter and sufficient to produce an optical output below 200 nanometers.

\* \* \* \* \*